US009762805B2

(12) United States Patent
Nakata

(10) Patent No.: US 9,762,805 B2
(45) Date of Patent: Sep. 12, 2017

(54) IMAGE PROCESSING APPARATUS PERFORMING TONE CORRECTION PROCESS AND METHOD, AND IMAGE CAPTURING APPARATUS PERFORMING TONE CORRECTION PROCESS

(71) Applicant: CANON KABUSHIKI KAISHA, Tokyo (JP)

(72) Inventor: Takamichi Nakata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/290,329

(22) Filed: May 29, 2014

(65) Prior Publication Data

US 2014/0354841 A1    Dec. 4, 2014

(30) Foreign Application Priority Data

May 29, 2013    (JP) .................................. 2013-113168

(51) Int. Cl.
*H04N 5/235* (2006.01)
*H04N 5/20* (2006.01)
(Continued)

(52) U.S. Cl.
CPC .......... *H04N 5/2351* (2013.01); *G06T 5/007*
(2013.01); *G06T 5/40* (2013.01); *H04N 5/20*
(2013.01)

(58) Field of Classification Search
CPC .......... G06T 5/40; G06T 7/403; G06T 5/007; H04N 1/4074; H04N 5/2355;
(Continued)

(56) References Cited

U.S. PATENT DOCUMENTS 7,068,328 B1 *    6/2006    Mino .................... G06T 5/009
                                                        348/437.1
2003/0099407 A1 *    5/2003    Matsushima ........ H04N 1/4074
                                                        382/274
(Continued)

FOREIGN PATENT DOCUMENTS

| JP | 2006-254104 A | 9/2006 |
| JP |     4376352 B | 12/2009 |
| JP | 2010-117884 A | 5/2010 |

OTHER PUBLICATIONS

The Mar. 17, 2017 Japanese Office Action that issued in Japanese Patent Application No. 2013113168.

*Primary Examiner* — Lin Ye
*Assistant Examiner* — Chan Nguyen
(74) *Attorney, Agent, or Firm* — Cowan, Liebowitz & Latman, P.C.

(57) ABSTRACT

An image processing apparatus comprising: an acquisition unit configured to acquire an image signal obtained by imaging an object by an image sensing unit; a generation unit configured to obtain a luminance distribution of the object based on the obtained image signal; a division unit configured to divide a region having a luminance lower than a predetermined luminance in the generated luminance distribution into a predetermined number of sub-regions, and obtain a most frequent region having a highest luminance frequency from the divided sub-regions; a selection unit configured to select a correction table corresponding to the obtained most frequent region from a plurality of correction tables stored in a storage unit; and a processing unit configured to perform a tone correction process on the image signal by using the selected correction table.

9 Claims, 8 Drawing Sheets

(51) Int. Cl.
*G06T 5/40* (2006.01)
*G06T 5/00* (2006.01)

(58) Field of Classification Search
CPC ...... H04N 5/2351; G06K 9/38; G06K 9/4642; G06K 9/4647; G06K 2017/0077
USPC ....... 348/217.1, 672; 382/168–172; 358/522; 702/180; 345/440.2
See application file for complete search history.

(56) References Cited

U.S. PATENT DOCUMENTS

| | | | |
|---|---|---|---|
| 2005/0180629 A1* | 8/2005 | Masuno | G06T 5/009 382/169 |
| 2006/0061842 A1* | 3/2006 | Oka | H04N 9/69 358/522 |
| 2006/0192878 A1* | 8/2006 | Miyahara | H04N 5/2355 348/333.01 |
| 2007/0041657 A1* | 2/2007 | Rychagov | G06K 9/036 382/274 |
| 2009/0207281 A1* | 8/2009 | Ono | H04N 5/23245 348/234 |
| 2009/0213271 A1* | 8/2009 | Miyazawa | G06T 5/009 348/672 |
| 2009/0304274 A1* | 12/2009 | Yoshii | G06T 5/009 382/167 |
| 2010/0034458 A1* | 2/2010 | Tada | G06T 5/007 382/167 |
| 2010/0053195 A1* | 3/2010 | Harada | G06T 5/009 345/589 |
| 2014/0204246 A1* | 7/2014 | Nishi | H04N 5/2355 348/239 |
| 2015/0103250 A1* | 4/2015 | Watanabe | H04N 5/21 348/576 |

* cited by examiner

FIG. 4
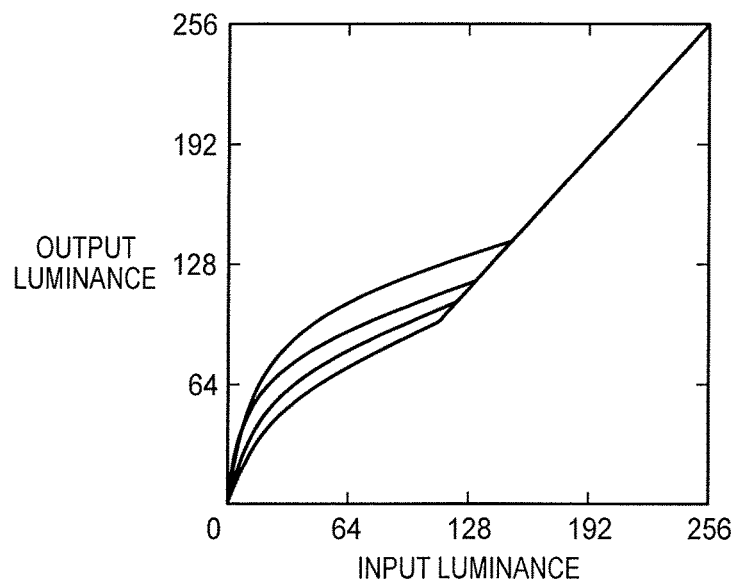
FIG. 5
| | DARK | | | | | | | BRIGHT |
|---|---|---|---|---|---|---|---|---|
| SUB-REGION NUMBER | 1 | 2 | 3 | 4 | 5 | 6 | 7 | 8 |
| TABLE NUMBER | 6 | 7 | 6 | 5 | 4 | 3 | 2 | 1 |
FIG. 6A
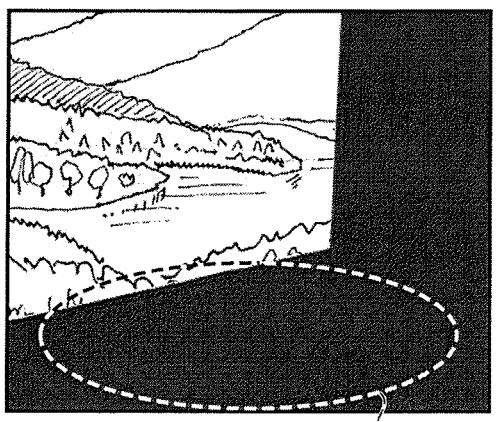
701
FIG. 6B
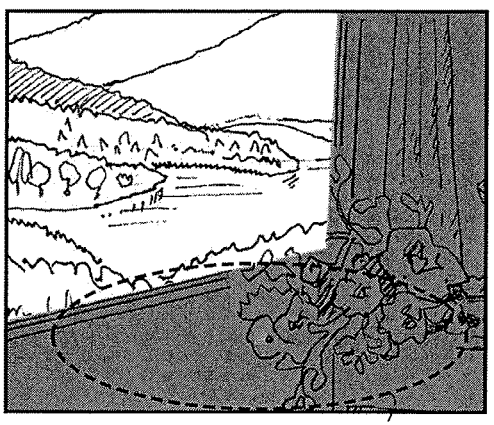
702

|  | SUB-REGION NUMBER | 1 | 2 | 3 | 4 | 5 | 6 | 7 | 8 |
|---|---|---|---|---|---|---|---|---|---|
| | PIXEL RATIO K | | | | | | | | |
| TABLE NUMBER | 0 ≤ K < 20 | 6 | 7 | 6 | 5 | 4 | 3 | 2 | 1 |
| | 20 ≤ K < 40 | 7 | 8 | 7 | 6 | 5 | 4 | 3 | 2 |
| | 40 ≤ K ≤ 100 | 8 | 9 | 8 | 7 | 6 | 5 | 4 | 3 |

DARK ← → BRIGHT

IMAGE PROCESSING APPARATUS PERFORMING TONE CORRECTION PROCESS AND METHOD, AND IMAGE CAPTURING APPARATUS PERFORMING TONE CORRECTION PROCESS

BACKGROUND OF THE INVENTION

Field of the Invention

The present invention relates to an image processing apparatus and method and an image capturing apparatus and, more particularly, to an image processing apparatus and method and an image capturing apparatus that perform digital dodging.

Description of the Related Art

A so-called, wide-dynamic-range camera is drawing attention. This camera has a wide dynamic range and can clearly capture both an extremely bright object and dark object coexisting in the same angle of view. Various tone correction methods have been examined as a method capable of this wide-dynamic-range image capturing. For example, a dodging process performed in a darkroom is available for silver halide photographs, and there is a technique (digital dodging process) that implements this dodging process as digital image processing, and corrects an object having a difference between brightness and darkness, particularly, an object in backlight. Also, the digital dodging process is performed by changing the gain in order to adjust the strength.

In Japanese Patent No. 4376352, a histogram is divided, and the tone of a low-luminance portion is corrected such that the slope of the tone characteristic of a portion where luminances are distributed most is steep. There is also disclosed a technique that adjusts the interval of division levels in ascending order of luminance level.

Unfortunately, if the slope of the level is simply steepened as in the related art disclosed in Japanese Patent No. 4376352, the tone may largely become discrete and deteriorate the image quality.

SUMMARY OF THE INVENTION

The present invention has been made in consideration of the above situation, and makes it possible to perform tone correction corresponding to an imaging target scene while suppressing image quality deterioration.

According to the present invention, provided is an image processing apparatus comprising: an acquisition unit configured to acquire an image signal obtained by imaging an object by an image sensing unit; a generation unit configured to obtain a luminance distribution of the object based on the obtained image signal; a division unit configured to divide a region having a luminance lower than a predetermined luminance in the generated luminance distribution into a predetermined number of sub-regions, and obtain a most frequent region having a highest luminance frequency from the divided sub-regions; a selection unit configured to select a correction table corresponding to the obtained most frequent region from a plurality of correction tables stored in a storage unit; and a processing unit configured to perform a tone correction process on the image signal by using the selected correction table.

Furthermore, according to the present invention, provided is an image capturing apparatus comprising: an image sensing unit; and the foregoing image processing apparatus.

Further, according to the present invention, provided is an image processing method comprising: acquiring an image signal obtained by imaging an object by an image sensing unit; obtaining a luminance distribution of the shot object based on the obtained image signal; dividing a region having a luminance lower than a predetermined luminance in the generated luminance distribution into a predetermined number of sub-regions; obtaining a most frequent region having a highest luminance frequency from the divided sub-regions; selecting a correction table corresponding to the obtained most frequent region from a plurality of correction tables stored in a storage unit; and performing a tone correction process on the image signal by using the selected correction table.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 4 is a view showing an example of a plurality of gain tables according to the first embodiment;

FIG. 5 is a view showing the relationship between the plurality of gain tables and divided sub-regions according to the first embodiment;

FIGS. 6A and 6B are views for explaining the relationship between the gain tables and sub-regions;

DESCRIPTION OF THE EMBODIMENTS

Exemplary embodiments of the present invention will be described in detail in accordance with the accompanying drawings.

<First Embodiment>

Figure 1:
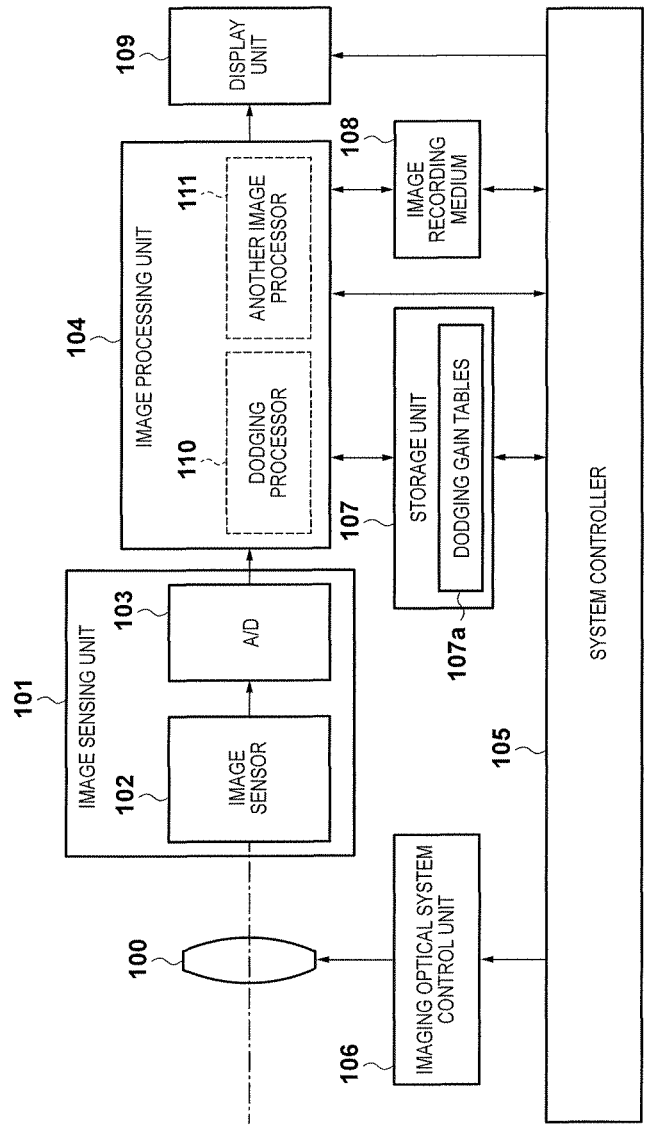
FIG. 1 is a block diagram showing an arrangement of an image capturing apparatus as an example of an image processing apparatus according to an embodiment of the present invention.

FIG. 1 is a block diagram showing an example of the basic configuration of an image capturing apparatus according to the first embodiment of the present invention. An object image (not shown) enters an image sensor 102 such as a CCD or CMOS sensor via an imaging optical system 100. Note that one lens represents the imaging optical system 100 in FIG. 1, but the imaging optical system 100 normally includes a plurality of lenses, a stop, and the like. An imaging optical system controller 106 performs mechanical driving for focus control, zoom control, exposure control, and the like of the imaging optical system 100 in accordance with instructions by a system controller 105.

The object image formed on the image sensor 102 is converted into an electrical signal, converted into a digital signal (image signal) by an A/D converter 103, and input to an image processing unit 104. The image sensor 102 and A/D converter 103 will collectively be referred to as an image sensing unit 101 hereinafter. The image processing unit 104 includes a dodging processor 110 and another image processor 111 for performing predetermined processing. The system controller 105 controls a series of processes in the image processing unit 104.

The dodging processor 110 selects a gain table (correction table) from a plurality of dodging gain tables 107a held in a storage unit 107 in accordance with luminance information of an input image signal, and applies the selected gain table to the input image signal. That is, the dodging processor 110 performs a digital dodging process as a tone correction process using the selected gain table on the input image signal. Note that the contents of practical processing in the dodging processor 110 will be described in detail later. After that, the other image processor 111 performs predetermined image processing such as gamma correction and color balance adjustment, thereby generating an image file such as JPEG.

The system controller 105 saves the image signal processed by the image processing unit 104 in an image recording medium 108 by using a predetermined format. Also, the system controller 105 causes a display unit 109 to display an image obtained by performing predetermined processing for display on the image signal processed by the image processing unit 104.

The foregoing is an example of the basic configuration of the image capturing apparatus according to the embodiment of the present invention. Note that the imaging optical system 100 is configured as a part of the image capturing apparatus in this embodiment, but the imaging optical system 100 may also be an interchangeable system such as that used in a single-lens reflex camera.

Figure 2:
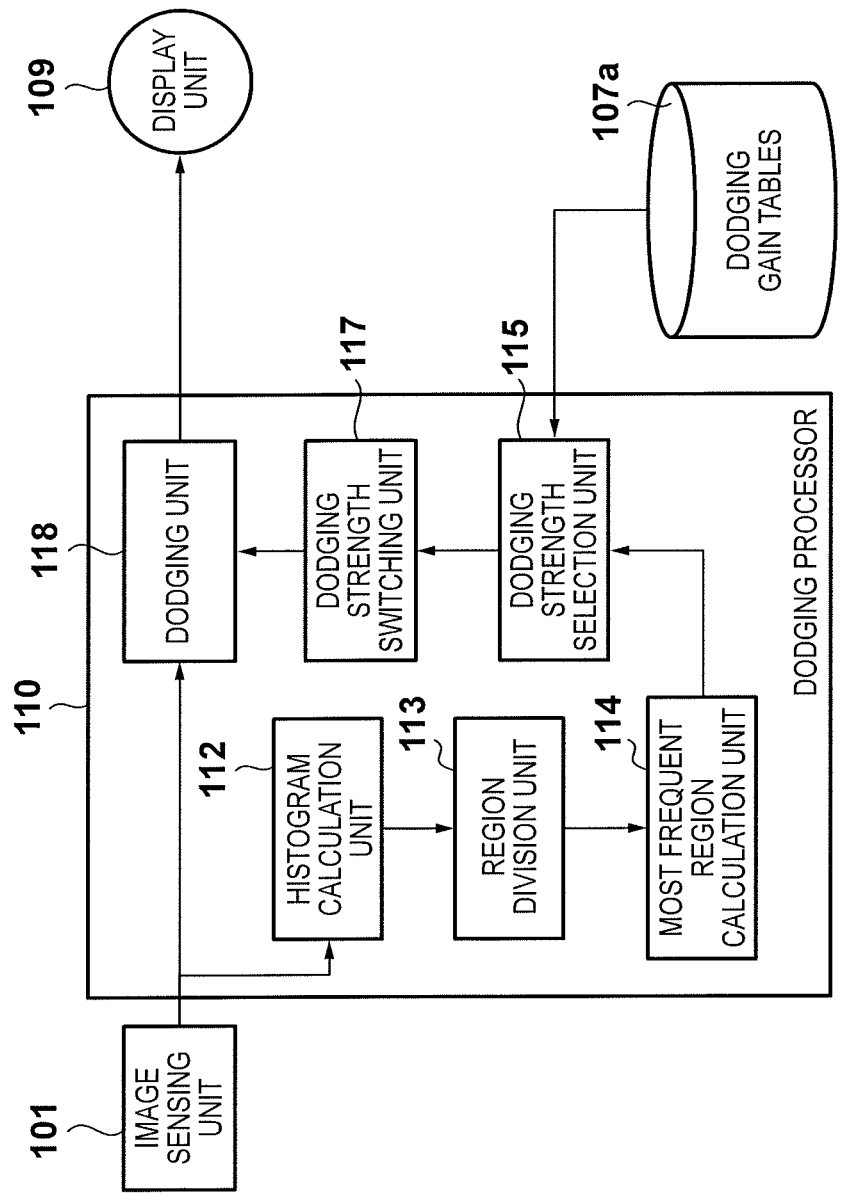
FIG. 2 is a block diagram showing an example of an arrangement of a dodging processor according to a first embodiment.

Next, the dodging processor 110 included in the image processing unit 104 will be explained. FIG. 2 is a block diagram showing an example of the arrangement of the dodging processor 110 in the first embodiment of the present invention. Referring to FIG. 2, a histogram calculation unit 112 generates a histogram indicating the luminance distribution of a captured object (image) based on an output signal from the image sensing unit 101. A region division unit 113 divides a region having a luminance equal to or lower than a predetermined threshold value into a plurality of sub-regions, in the histogram output from the histogram calculation unit 112.

Figure 3A:
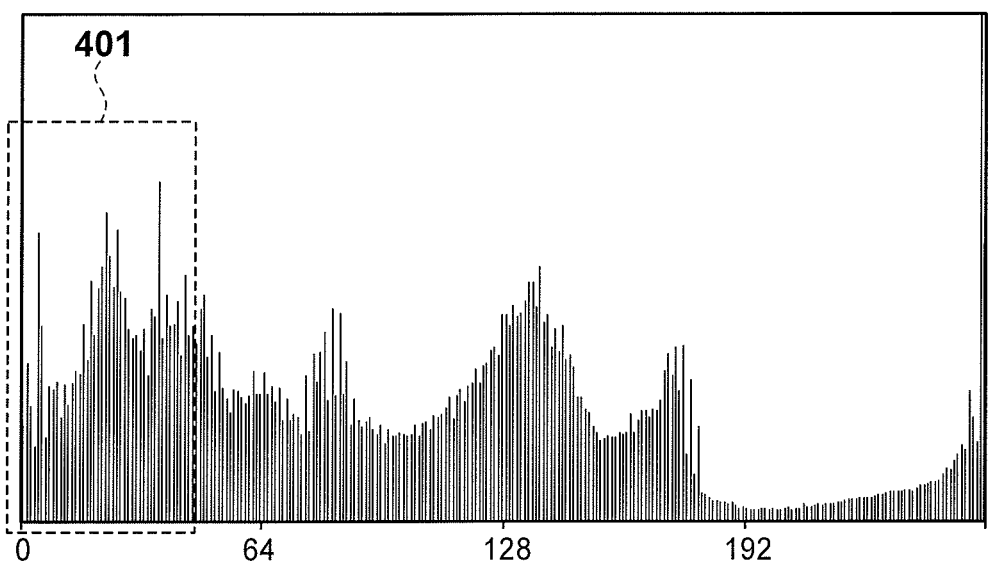
FIGS. 3A and 3B are views showing examples of a histogram representing the luminance distribution of an image.
Figure 3B:
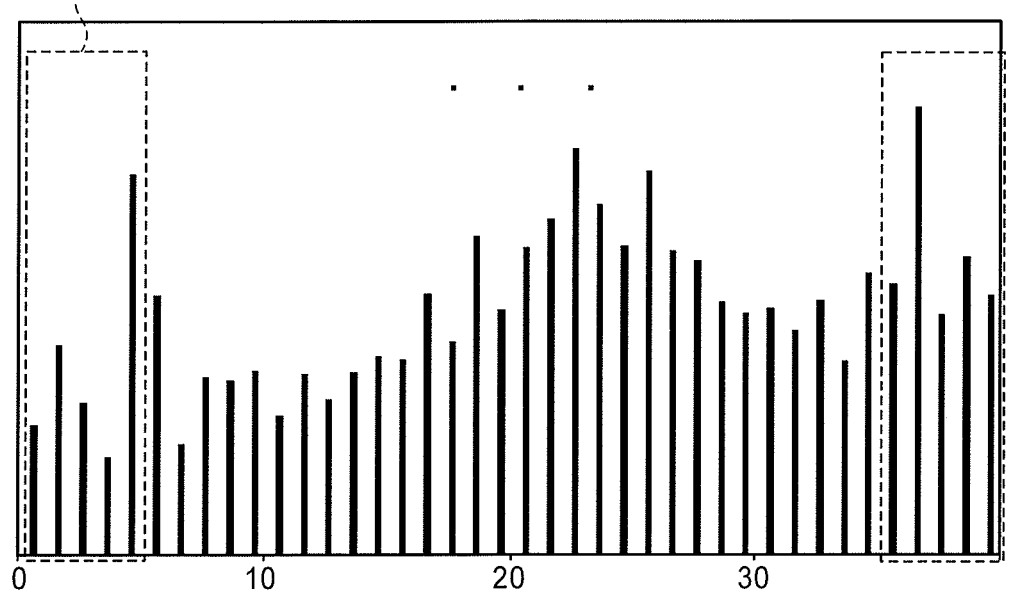

FIG. 3A is a view showing an example of the histogram obtained by capturing an object. In FIG. 3A, a region 401 enclosed with the broken lines represents a region equal to or lower than the predetermined threshold value. FIG. 3B shows the region 401 in an enlarged scale. In the region 401 equal to or lower than the predetermined luminance value, a plurality of luminance regions are collected, and the frequencies are added up, thereby generating one sub-region, as indicated by a region 501 enclosed with the broken lines. Other sub-regions are similarly generated, thereby dividing the region 401 equal to lower than the predetermined luminance value.

The predetermined threshold value herein mentioned is a value by which an image observer feels darkness if the number of pixels having luminances equal to or lower than this threshold value is large. In the first embodiment, a luminance value of about 40 is the predetermined threshold value in an 8-bit output image. Also, the number of divided sub-regions is set to about 8 in the first embodiment by taking account of the resolution of a gain table. However, these values are not limited to these examples, and a designer or user can freely set them.

A most frequent region calculation unit 114 calculates a sub-region (most frequent region) having a maximum frequency among the plurality of sub-regions divided by the region division unit 113. Based on this most frequent region calculated by the most frequent region calculation unit 114, a dodging strength selection unit 115 selects a gain table in accordance with a predetermined correlation (relation information) from the plurality of preset dodging gain tables 107a stored in the storage unit 107.

FIG. 4 shows an example of the plurality of dodging gain tables 107a. Note that FIG. 4 shows the relationship of the output luminance to the input luminance, but the dodging gain table may also be a table holding a gain for making the input luminance equal to the output luminance as shown in FIG. 4.

Also, FIG. 5 is a view showing the relationship between the plurality of dodging gain tables 107a stored in the storage unit 107 and the sub-regions divided by the region division unit 113. Referring to FIG. 5, each table number indicates one of the plurality of dodging gain tables 107a. For the gain tables as shown in FIG. 4, for example, numbers are assigned in ascending order of gain like 1, 2, . . . , 7. In addition, sub-region numbers assigned to the plurality of divided sub-regions are 1, 2, . . . , 8 in ascending order of luminance. The dodging strength selection unit 115 holds these tables, and determines a gain table to be used based on these tables. For example, when the most frequent region calculated by the most frequent region calculation unit 114 is sub-region 5, the dodging strength selection unit 115 selects gain table 4.

FIGS. 6A and 6B illustrate images obtained by capturing a window from inside a room, as an example for explaining the relationship between the gain table and sub-region. FIG. 6A shows an image before the dodging process, and FIG. 6B shows an image after the dodging process. Assume that a broken-line region 701 is a region with a luminance having the highest frequency, that is, a most frequent region among regions equal to or lower than the predetermined luminance value. A gain table corresponding to this most frequent region is a gain table capable of correcting the luminance of the most frequent region into a predetermined luminance by which an object is recognizable, as indicated by a broken-line region 702. By using a gain table like this, an image in which a portion around the window is dark as shown in FIG. 6A before the dodging process is performed can be changed into an image in which the dark portion is brightened and the luminance value is raised as shown in FIG. 6B by performing the dodging process.

The gain tables and sub-regions shown in FIG. 5 are so correlated that regardless of which sub-region is the most frequent region, the sub-region is correlated with a gain table by which the luminance of the most frequent region is changed into the luminance with which an object is recognizable, as in the case of FIGS. 6A and 6B. When the most frequent region is the darkest region of an image, that is, sub-region 1, however, if a high gain is applied by increasing the strength of the dodging process, an adverse effect may occur, for example, the tone may become discrete, or a normally inconspicuous color misregistration may largely be emphasized to give color to an achromatic pixel. In this embodiment, therefore, a gain corresponding to darkest sub-region 1 is set lower than that corresponding to sub-region 2 brighter than sub-region 1. Note that the correlation between the gain tables and sub-regions shown in FIG. 5 is an example, and the gain corresponding to sub-region 2 need not always be highest. For example, it is also possible to make a gain corresponding to sub-region 3 highest, and decrease a gain as the position of a sub-region moves away from sub-region 3. However, if a sub-region corresponding to the highest gain is brightened, a gain corresponding to a dark sub-region decreases accordingly, so the effect of brightening a dark portion obtained by the dodging process weakens. Accordingly, a sub-region corresponding to the highest gain is preferably set by taking account of the balance between the effect of the dodging process and the above-mentioned adverse effect.

A dodging strength switching unit 117 sets the gain table selected by the dodging strength selection unit 115 in a dodging unit 118. The dodging unit 118 applies the dodging process on the image obtained from the image sensing unit 101 by using the gain table set by the dodging strength switching unit 117.

Figure 7:
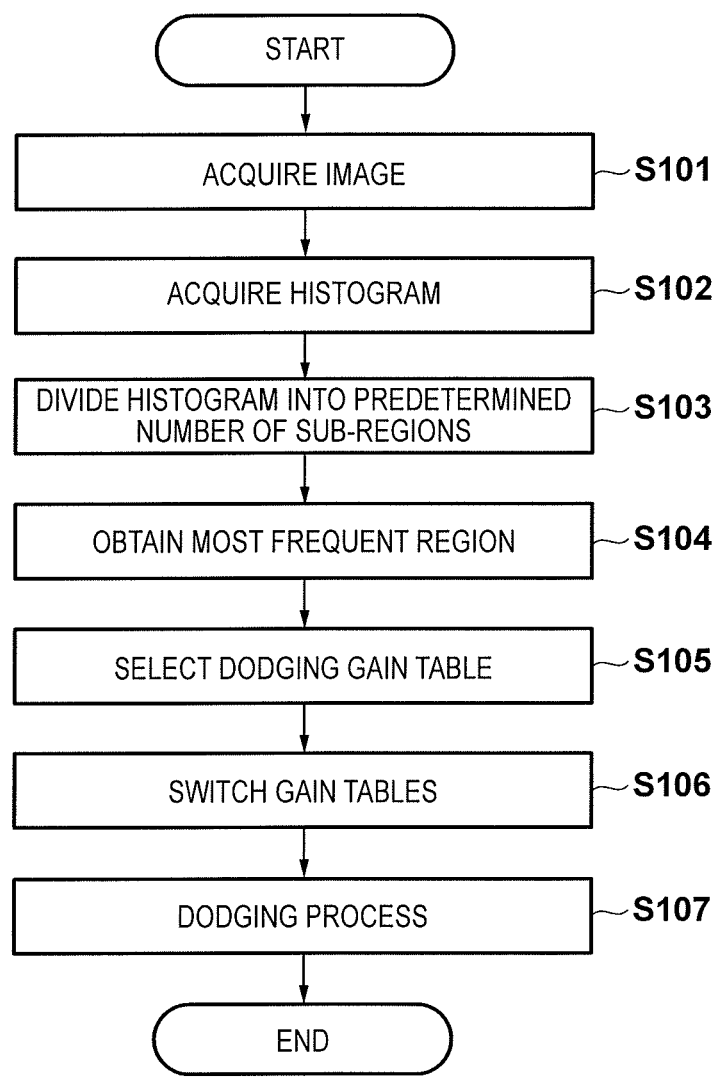
FIG. 7 is a flowchart showing the procedure of a dodging process according to the first embodiment.

FIG. 7 is a flowchart showing the procedure of the dodging process of the first embodiment performed by the dodging processor 110. First, an image signal is acquired from the image sensing unit 101 in step S101. The acquired image signal is input to the histogram calculation unit 112 and dodging unit 118. In step S102, the histogram calculation unit 112 calculates the histogram of the captured object based on the input image signal. In step S103, a region equal to or lower than the predetermined luminance value in the histogram calculated in step S102 is divided into a predetermined number of sub-regions.

In step S104, the most frequent region calculation unit 114 calculates the total values of the frequencies of histograms included in the sub-regions divided in step S103, and compares the calculated total values, thereby obtaining a sub-region (most frequent region) having the largest value. In step S105, the dodging strength selection unit 115 selects, based on the table shown in FIG. 5, a gain table corresponding to the most frequent region obtained in step S104 from the plurality of dodging gain tables 107*a*.

In step S106, the dodging strength switching unit 117 overwrites the set value of the present gain table on the gain table selected in step S105. In step S107, the dodging unit 118 performs the dodging process on the image signal obtained from the image sensing unit 101 by using the set gain table.

According to the first embodiment as described above, a tone correction process having an appropriate intensity corresponding to an imaging target scene (the feature of an object) can be performed while suppressing image quality deterioration.

<Second Embodiment>

Next, the second embodiment of the present invention will be explained. Note that the arrangement of an image capturing apparatus according to the second embodiment is the same as that explained in the first embodiment with reference to FIGS. 1 and 2, so a repetitive explanation will be omitted. The difference of the second embodiment from the first embodiment is processing in a dodging strength selection unit 115. Accordingly, the processing of the dodging strength selection unit 115 will be explained below.

Figure 8:
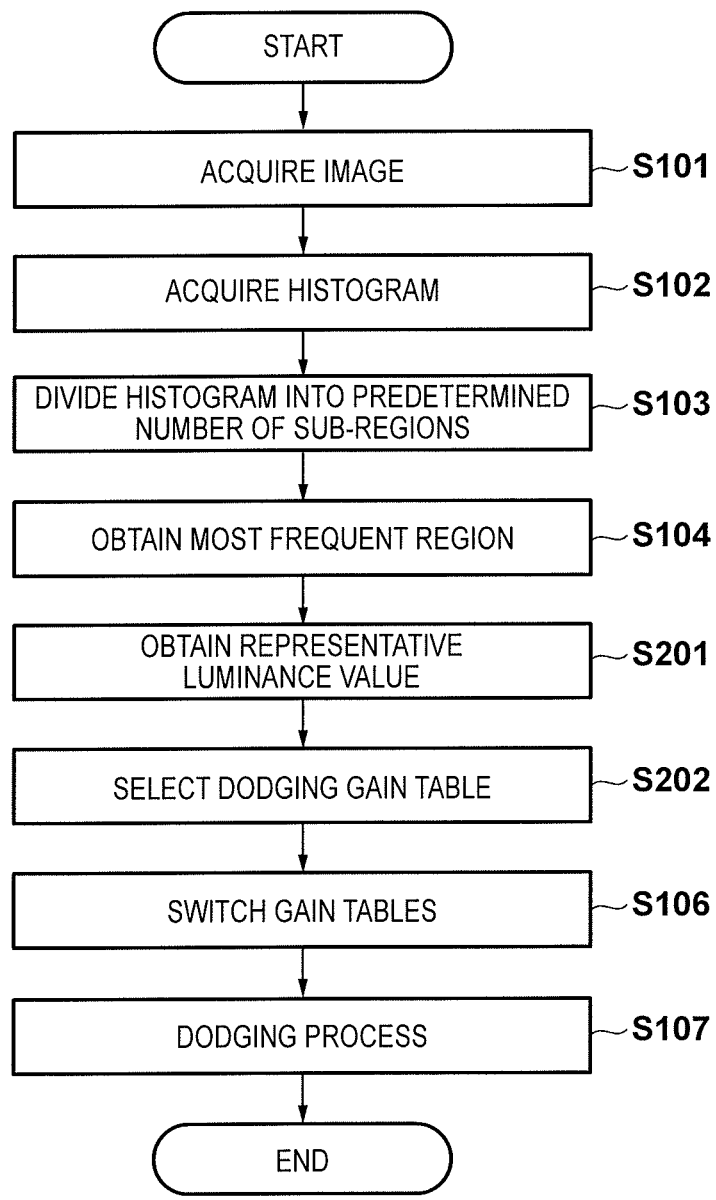
FIG. 8 is a flowchart showing the procedure of a dodging process according to a second embodiment.

FIG. 8 is a flowchart showing the procedure of a dodging process of the second embodiment performed by a dodging processor 110. Note that the same reference numerals denote the same processes as explained with reference to FIG. 7, so a repetitive explanation will be omitted.

A most frequent region is obtained by processing up to step S104. In the second embodiment, the dodging strength selection unit 115 obtains a representative luminance value of the most frequent region in step S201. Note that the representative luminance value includes, for example, the mean, median, maximum value, minimum value, or most frequent value of the luminances of the most frequent region. In step S202, a gain table that makes the obtained representative luminance value (input) closest to a target luminance value (output) is selected from a plurality of dodging gain tables 107*a* stored in a storage unit 107. In the second embodiment, therefore, the dodging strength selection unit 115 need not have any such table as shown in FIG. 5. Note that the target luminance value means a luminance value that increases the visibility, and is a luminance value of, for example, 60 or more when an image is an 8-bit output. However, the target luminance value is not limited to this example, and can be determined in accordance with, for example, the resolution of an output image. In processing after step S106, the dodging process is performed by using the gain table selected in step S202. If a high gain is applied to increase the strength of the dodging process when the representative luminance value of the most frequent region is low, an adverse effect may occur, for example, the tone may become discrete, or a normally inconspicuous color misregistration may largely be emphasized to give color to an achromatic pixel. Therefore, selectable gain tables may also be restricted in accordance with the representative luminance value of the most frequent region. Alternatively, the target luminance value may be changed in accordance with the representative luminance value of the most frequent region.

As described above, even when a gain table that makes the representative luminance value of the most frequent region equal to the target luminance value is selected, the input luminance value is corrected to a luminance value that makes the object recognizable. Consequently, an image in which a portion around the window is dark as shown in FIG. 6A before the dodging process is performed can be changed into an image in which the dark portion is brightened and the luminance value is raised as shown in FIG. 6B by performing the dodging process.

Note that in the above-mentioned example, a gain table as shown in FIG. 4 is selected based on the representative luminance value. However, a gain table is selected as follows when the dodging gain table 107*a* is a table holding a gain for performing conversion to the output luminance as shown in FIG. 4. First, an amplification factor for changing the representative luminance value into the target luminance value is calculated. After that, a gain table having a gain closest to the amplification factor calculated for the representative luminance value is selected.

Alternatively, when a gain table as shown in FIG. 4 is held, it is also possible to obtain the gains of the output luminances to the input luminances of the plurality of dodging gain tables 107*a* at the representative luminance value, and select a gain table having a gain closest to the calculated amplification factor.

In the second embodiment as explained above, a tone correction process having an appropriate intensity corresponding to an imaging target scene (the feature of an object) can be performed while suppressing image quality deterioration.

<Third Embodiment>

The third embodiment of the present invention will now be explained. Conventionally, when setting a gain table by a manual operation, a discrete gain table that does not continuously change in accordance with a continuous change in luminance is sometimes used in order to obtain a special effect desired by a user. When a discrete gain table like this is included in a plurality of dodging gain tables 107a, however, if this discrete gain table is automatically selected in the same manner as in the above-described second embodiment, an image unintended by the user may be obtained. Accordingly, the feature of the third embodiment is to perform control so as not to select a gain table capable of obtaining a special effect as described above.

Figure 9:
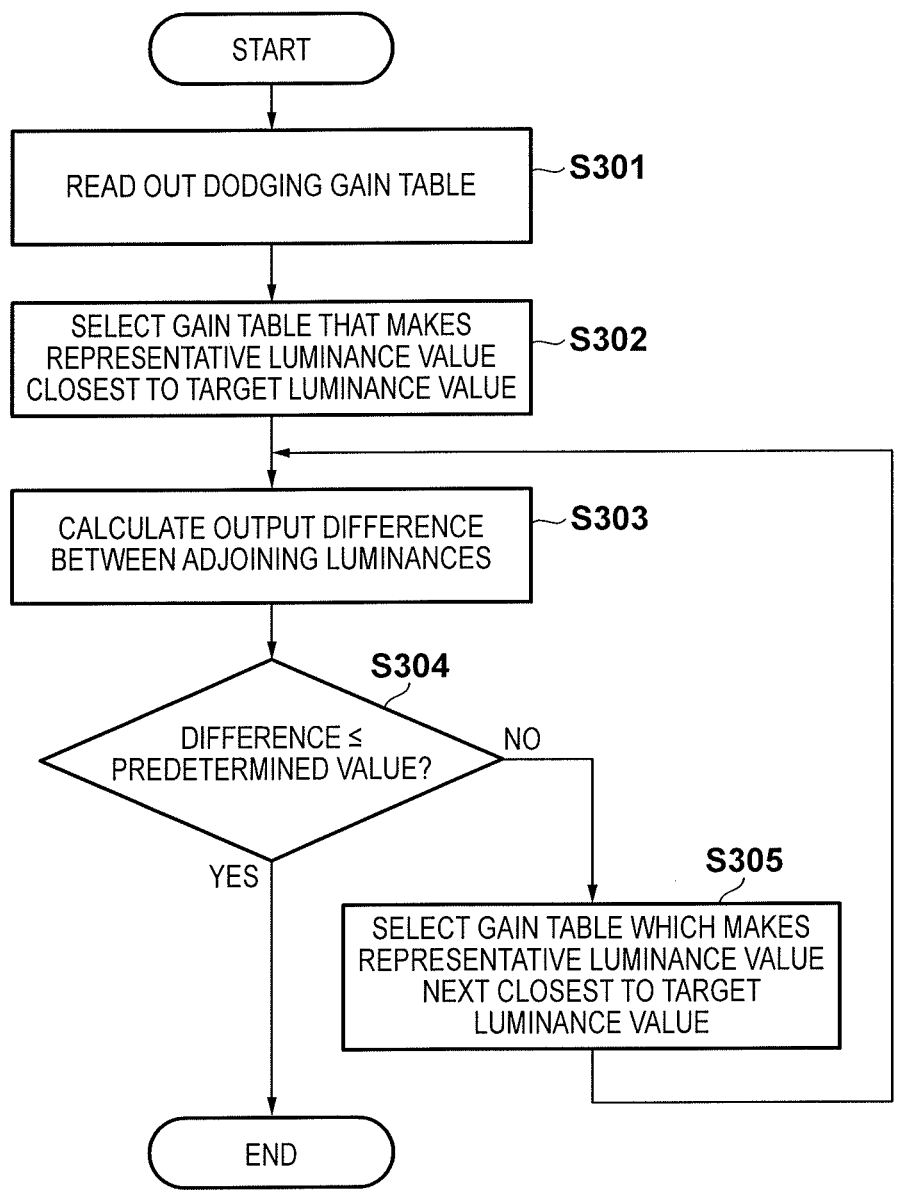
FIG. 9 is a flowchart of a dodging gain table selection process according to a third embodiment.

The arrangement and processing of an image capturing apparatus according to the third embodiment are the same as the above-described second embodiment except for a dodging process gain table selection process in step S202 of FIG. 8. Therefore, the process performed in step S202 of FIG. 8 in the third embodiment will be explained below with reference to a flowchart shown in FIG. 9. Note that a dodging strength selection unit 115 performs this process.

In step S301, the dodging strength selection unit 115 reads out all of the plurality of dodging gain tables 107a from a storage unit 107. In step S302, a gain table that makes the representative luminance value (input) of the most frequent region closest to the target luminance value (output) is selected from the readout dodging gain tables 107a. In step S303, output differences between adjoining luminances when using the gain table selected in step S302 are calculated over all input luminances. If the calculated output differences between adjoining luminances are equal to or lower than a predetermined value in step S304, the process advances to step S106 in FIG. 8, and the gain table selected in step S302 is determined as a gain table to be used.

On the other hand, if the calculated output differences between adjoining luminances exceed the predetermined value in step S304, a gain table closest to the target luminance value next to the selected gain table is selected in step S305. Then, the process returns to step S304, and the above-described process is repeated.

In the third embodiment as explained above, even when a gain table capable of obtaining a special effect is included in choices, a tone correction process having an appropriate intensity corresponding to an imaging target scene (the feature of an object) can be performed while suppressing image quality deterioration.

<Modification>

In the third embodiment, the process of reselecting a gain table when output differences between adjoining luminances calculated over all input luminances exceed a predetermined value has been explained. As a condition for reselecting a gain table, however, it is also possible to set different gain upper limits for a manual operation and automatic selection, and reselect a gain table if the output of a gain table selected by the automatic selection exceeds the gain upper limit.

Figures 10, 11:
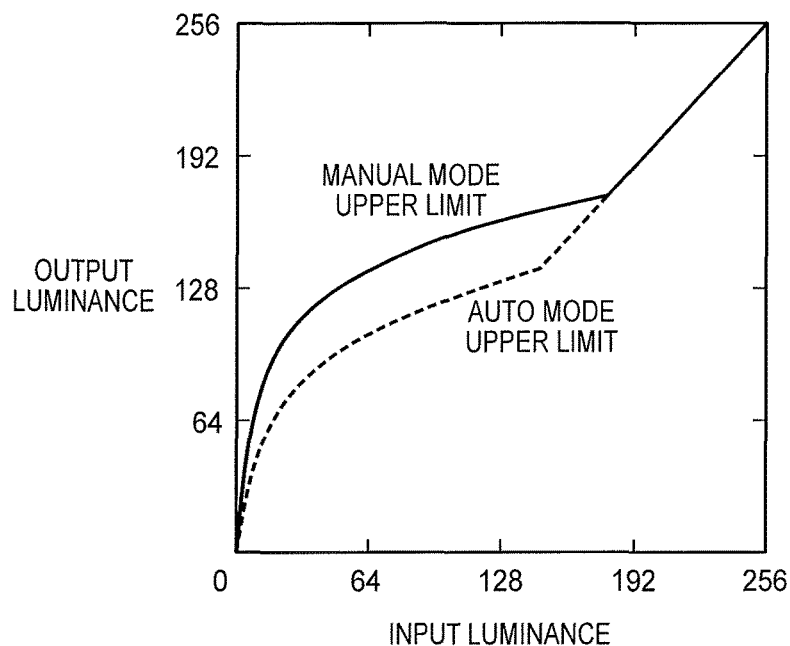
FIG. 10 is a view showing gain upper limits in a manual operation and automatic selection according to a modification.
FIG. 11 is a view showing the relationship between a plurality of gain tables and divided sub-regions according to a fourth embodiment.

FIG. 10 is a view showing the gain upper limits for the manual operation and automatic selection. The upper limit for the manual operation is set higher than that for the automatic selection. In the automatic selection, if the output for all input luminances obtained by the gain table selected in step S303 of FIG. 9 described above exceeds the upper limit for the automatic selection, a gain table next closest to the representative luminance value is reselected so that the upper limit is not exceeded.

It is also possible to allow a user to set the upper limit as needed, instead of fixing it.

<Fourth Embodiment>

Next, the fourth embodiment of the present invention will be explained below. The difference of the fourth embodiment from the above-described first to third embodiments is processing in a dodging strength selection unit 115. The rest of the arrangement and processing are the same as explained in the first embodiment with reference to the accompanying drawings, so the difference will be explained below.

In the fourth embodiment, the dodging strength selection unit 115 holds a table indicating the relationship between a plurality of dodging gain tables 107a and sub-regions divided by a region division unit 113, as shown in FIG. 11. Referring to FIG. 11, sub-region numbers assigned to the plurality of divided sub-regions are 1, 2, . . . , 8 in ascending order of luminance as in FIG. 5. Also, table numbers each indicate one of the plurality of dodging gain tables 107a, and are assigned in ascending order of gain like 1, 2, . . . , 9.

Also, a pixel ratio K is calculated as follows. The dodging strength selection unit 115 acquires the frequency of luminances included in a region (a region 401 shown in FIG. 3A) having luminances equal to or lower than a predetermined threshold value and detected by the region division unit 113, and the total frequency of the whole histogram (the whole region shown in FIG. 3A) obtained by a histogram calculation unit 112. Then, the ratio of the two acquired frequencies is calculated as the pixel ratio K by:

Pixel ratio K=frequency equal to or lower than predetermined threshold value/total frequency of histogram In accordance with the pixel ratio K thus calculated and the most frequent region, a gain table to be used is selected from the plurality of dodging gain tables 107a.

If the pixel ratio K of the frequency equal to or lower than the predetermined threshold value is low, the amount of dark region (equal to or lower than the predetermined luminance) is small in a frame. Also, as the pixel ratio K rises, the amount of dark region increases in a frame. As shown in FIG. 11, therefore, a correlation is made such that even when the same sub-region is the most frequent region, a gain table having a low gain is selected when the pixel ratio K is low, and a gain table having a high gain is selected when the pixel ratio K is high.

In the fourth embodiment, in the process of step S105 explained in the first embodiment with reference to FIG. 7, a gain table to be used is selected from the plurality of dodging gain tables 107a following the above-described procedure.

Note that a gain table to be selected in the process of step S105 may also be corrected in accordance with a user's intention. For example, it is also possible to allow the user to select the effect of tone correction from strong, middle, and weak by a manual operation, and change the correlation between the sub-region numbers and table numbers in accordance with the effect selected by the user. As an example, assuming that the table shown in FIG. 11 is obtained when the effect selected by the user is middle, the table number is corrected by +1 if the effect selected by the user is strong, and the table number is corrected by −1 if the effect selected by the user is weak. As another example, assuming that the table shown in FIG. 11 is obtained when the effect selected by the user is strong, table numbers of 9 or more are corrected to 8 if the effect selected by the user is middle, and table numbers of 8 or more are corrected to 7 if the effect selected by the user is weak. This makes it possible to perform a tone correction process having an appropriate intensity corresponding to an imaging target scene (the feature of an object) and the user's intention while suppressing image quality deterioration.

In the fourth embodiment as explained above, a tone correction process having an appropriate intensity corresponding to an imaging target scene (the feature of an object) better than in the first to third embodiments can be performed while suppressing image quality deterioration.

Note that an example in which the present invention is applied to the dodging process as one tone correction method has been explained in each of the above-mentioned four embodiments, but the present invention is also applicable to another tone correction method. For example, the present invention is applicable to gamma correction of applying a gain higher than that of a high-luminance portion to a low-luminance portion, thereby brightening the low-luminance portion while suppressing a highlight-detail loss of the high-luminance portion. In this method, a plurality of types of gain tables (gamma curves) for gamma correction are stored in the storage unit 107 instead of the dodging gain tables in the above-mentioned four embodiments, and a gain table is selected in the same manner as in the four embodiments.

Although the preferred embodiments of the present invention have been explained above, the present invention is not limited to these embodiments, and various modifications and changes can be made without departing from the spirit and scope of the invention.

<Other Embodiments>

Note that the present invention can be applied to a system including a plurality of devices, and can also be applied to an apparatus.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-113168, filed on May 29, 2013 which is hereby incorporated by reference herein in its entirety.

What is claimed is:

1. An image processing apparatus comprising:
at least one processor, and
a memory storing instructions for causing the at least one processor to perform operations of following units:
an acquisition unit configured to acquire an image signal obtained by imaging an object by an image sensing unit:
a generation unit configured to obtain a luminance distribution of the object based on the obtained image signal;
a division unit configured to divide a partial region having a luminance lower than a predetermined luminance extracted from the generated luminance distribution into a predetermined number of sub-regions, and obtain a most frequent region having a highest luminance frequency from the divided sub-regions;
a selection unit configured to select a correction table, based on the obtained most frequent region and a ratio of an image signal having a luminance lower than the predetermined luminance in the obtained image signal, from a plurality of correction tables stored in a storage unit; and
a processing unit configured to perform a tone correction process on the image signal by using the selected correction table,
wherein the selection unit selects a correction table with which the image signal is corrected in larger degree in the tone correction process as the ratio increases.

2. The apparatus according to claim 1, wherein said selection unit has relation information between the ratio of the image signal, the plurality of correction tables, and the divided sub-regions, and selects a correction table corresponding to the ratio of the image signal and the most frequent region based on the relation information.

3. The image processing apparatus in accordance with claim 1, wherein each of the sub-regions is determined from a plurality of luminance frequencies included in the region having a luminance lower than a predetermined luminance.

4. The image processing apparatus in accordance with claim 1, wherein the most frequent region is obtained by determining, for each sub-region, a total value of luminance frequencies included in the sub-region, and comparing the total values among all sub-regions.

5. The image processing apparatus in accordance with claim 1, further comprising manual operation unit that accepts user instruction for selecting strength of the tone correction effect, wherein the selection unit changes the correction table according to the user instruction.

6. The image processing apparatus in accordance with claim 1, wherein the correction table holds a gain for making an input luminance to predetermined output luminance.

7. An image capturing apparatus comprising:
an image sensor; and
the image processing apparatus comprising at least one processor, and a memory storing instruction for causing the at least one processor to perform operations of following units:
an acquisition unit configured to acquire an image signal obtained by imaging an object by an image sensing unit;
a generation unit configured to obtain a luminance distribution of the object based on the obtained image signal;
a division unit configured to divide a partial region having a luminance lower than a predetermined luminance extracted from the generated luminance distribution into a predetermined number of sub-regions, and obtain a most frequent region having a highest luminance frequency from the divided sub-regions;
a selection unit configured to select a correction table, based on the obtained most frequent region and a ratio of an image signal having a luminance lower than the predetermined luminance in the obtained image signal, from a plurality of correction tables stored in a storage unit; and a processing unit configured to perform a tone correction process on the image signal by using the selected correction table, wherein the selection unit selects a correction table with which the image signal is corrected in larger degree in the tone correction process as the ratio increases.

8. An image processing method comprising:

acquiring an image signal obtained by imaging an object by an image sensing unit;

obtaining a luminance distribution of the shot object based on the obtained image signal;

dividing a partial region having a luminance lower than a predetermined luminance extracted from the generated luminance distribution into a predetermined number of sub-regions;

obtaining a most frequent region having a highest luminance frequency from the divided sub-regions;

selecting a correction table, based on the obtained most frequent region and a ratio of an image signal having a luminance lower than the predetermined luminance in the obtained image signal, from a plurality of correction tables stored in a storage unit; and performing a tone correction process on the image signal by using the selected correction table, wherein the correction table is selected such that the image signal is corrected in larger degree in the tone correction process as the ratio increases.

9. A non-transitory computer readable storage medium having stored thereon a program which is executable by an image processing apparatus, the program having a program code for realizing the image processing method comprising:

acquiring an image signal obtained by imaging an object by an image sensing unit;

obtaining a luminance distribution of the shot object based on the obtained image signal;

dividing a partial region having a luminance lower than a predetermined luminance extracted from the generated luminance distribution into a predetermined number of sub-regions;

obtaining a most frequent region having a highest luminance frequency from the divided sub-regions;

selecting a correction table based on the obtained most frequent region and a ratio of an image signal having a luminance lower than the predetermined luminance in the obtained image signal, from a plurality of correction tables stored in a storage unit; and performing a tone correction process on the image signal by using the selected correction table, wherein the correction table is selected such that the image signal is corrected in larger degree in the tone correction process as the ratio increases.

* * * * *